July 9, 1929.   S. J. MORAN   1,720,340
AUTOMOBILE BRAKING DEVICE
Filed Nov. 1, 1927
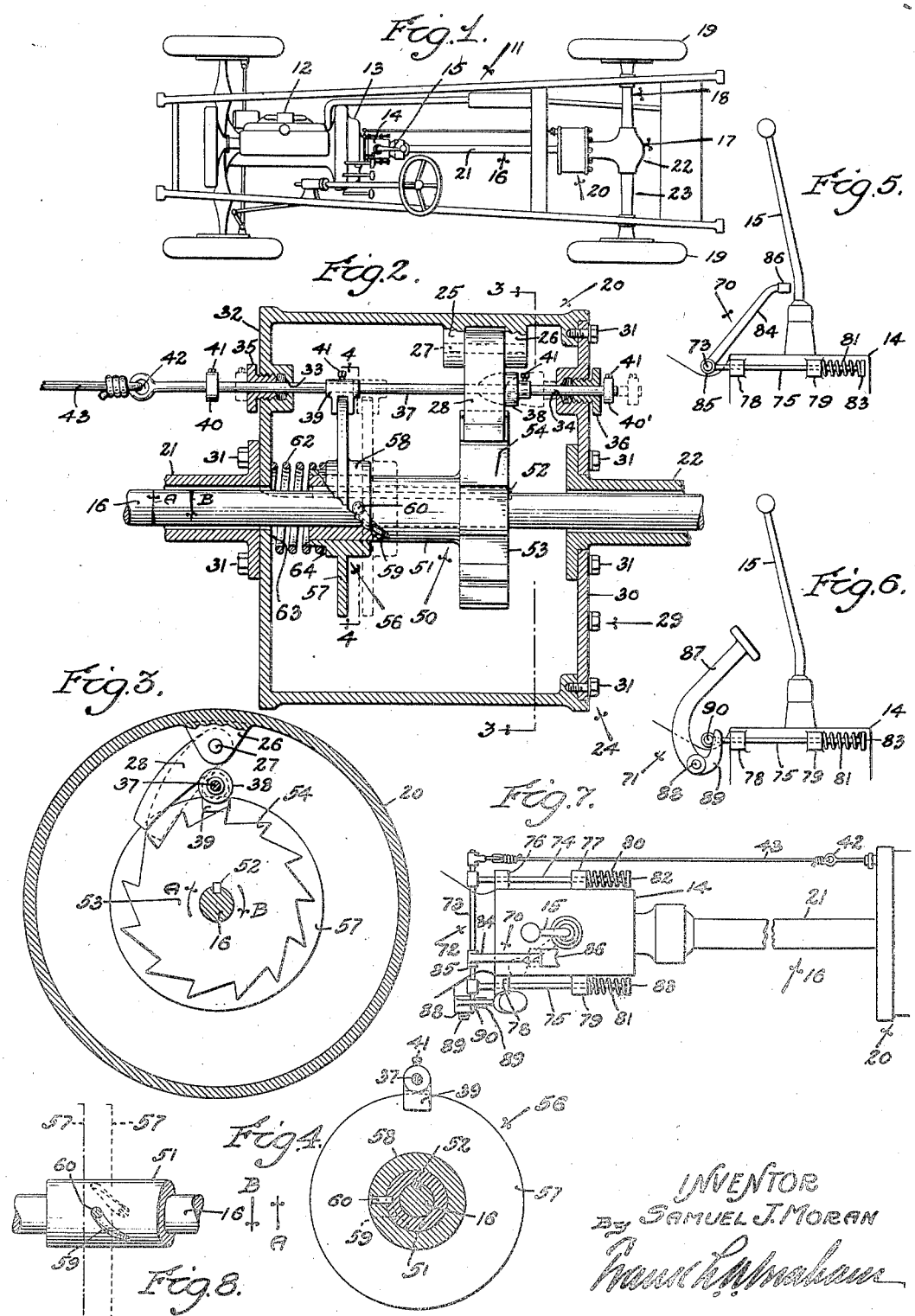

Patented July 9, 1929.

1,720,340

UNITED STATES PATENT OFFICE.

SAMUEL J. MORAN, OF LOS ANGELES, CALIFORNIA, ASSIGNOR OF ONE-HALF TO RALPH L. BELL, OF LOS ANGELES, CALIFORNIA.

AUTOMOBILE BRAKING DEVICE.

Application filed November 1, 1927. Serial No. 230,298.

My invention relates to a new and novel type of braking device for use in motor vehicles, being more particularly a device which is automatically operable to prevent the movement of such a vehicle in one direction only.

It is a common experience encountered by drivers of automobiles and trucks, in stopping the machine while driving up a grade or incline, to have the machine start "drifting" backward while the clutch is in disengagement. This is a source of much inconvenience in the driving of automobiles in traffic where there is always danger of collision with "the car behind" and some confusion arises between the operation of the foot brake and the accelerator. It is also a source of danger, as well as inconvenience, in driving heavily loaded trucks over grades where the engine may stall or it may otherwise become necessary to stop the truck and the operator may not have time to engage the brake with sufficient force to hold the weight of the truck from "drifting".

It has, therefore, been an object of my invention to develop a braking device for use on motor driven vehicles, which will automatically be brought into positive engagement immediately upon the initiation of a rearward drifting movement of the vehicle.

It is a further object of my invention to provide such a device with means whereby the placement of the vehicle in a reverse gear will automatically disengage the mentioned brake, and it is a still further object of my invention to provide the device with means whereby the brake may optionally be manually disengaged in case it is desirable to permit a rearward drifting movement of the vehicle.

Other objects and advantages of my invention will be better understood from the following description of an illustrative embodiment of my invention, taken in connection with the appended claims and the accompanying drawings, in which Fig. 1 is a plan view of an automobile chassis, showing one embodiment of my invention mounted upon the drive shaft.

Fig. 2 is a sectional elevation, showing an embodiment of my invention.

Fig. 3 is a sectional view along the line 3—3 of Fig. 2.

Fig. 4 is a sectional view along the line 4—4 of Fig. 2.

Fig. 5 is an elevational view, showing a reverse gear brake-disengaging means used in connection with my invention.

Fig. 6 is an elevational view of a manual brake-disengaging means.

Fig. 7 is a plan view, illustrating the arrangement of the brake-disengaging means, and Fig. 8 is a diagrammatic view illustrating the operation of the pawl actuating disk.

The general construction of my invention as herein illustrated consists of a ratchet wheel which may be rigidly mounted upon the driving mechanism any place between the clutch and the driving wheels, a pawl which is pivotally suspended from a rigid support relative to the ratchet wheel, and means for actuating the mentioned pawl upon its pivot to engage the ratchet.

More particularly describing my invention, 11 indicates the chassis of an automobile or other motor vehicle having a motor 12, a clutch 13, a transmission 14, a gear shifting lever 15, a drive shaft 16, a differential 17, a rear axle 18, and driving wheels 19.

Mounted upon the driving means (which, in the embodiment of my invention illustrated, would comprise the drive shaft 16, but may be any part of the driving system between the clutch 13 and the driving wheels 19, such as a rear axle 18) I show an embodiment of my novel braking device generally indicated at 20.

It will be understood that the drive shaft, the differential and the rear axle generally indicated at 16, 17 and 18 respectively in Fig. 1, are each provided with a drive shaft housing 21, a differential housing 22 and a rear axle housing 23 respectively. The brake device 20 comprises an enclosing housing 24, which is shown as being mounted between the drive shaft housing 21 and the differential housing 22, but may be made integral with either one of the mentioned housings. Upwardly and rigidly mounted in the brake housing 24, I provide a pair of pivot supporting fingers 25 and 26, adapted to receive a pivot pin 27, which in turn supports a pawl 28. One face of the housing 24 (illustrated as the rear face 29) is provided with an annular plate 30, which is retained in place by means such as the bolts 31, and which is adapted to render the parts contained within the housing readily accessible. The forward face 32 of the housing 24 and the annular plate 30 I show containing apertures 33 and 34, which are provided with packing glands 35 and 36 and are coaxially arranged to receive a pawl actuating rod 37. The pawl actuating rod 37 is provided inside of the housing with a pawl operating cam member 38 and a U member 39 (the purpose of which will be hereinafter described), and outside of the housing each end of the rod is provided with a stop collar 40, 40'. These four members, 38, 39, 40 and 40', are held in rigid adjustment upon the rod 37 by means such as the set screws 41. The forward end of the rod 35 is provided with an eye 42 which is adapted to receive a cable or other motion transmitting means 43.

Mounted upon the drive shaft 16 within the housing 24, I provide a ratchet member 50, which comprises a hub 51 rigidly secured to the shaft 16 by means such as the key 52, and having formed thereon the ratchet wheel 53, provided with teeth 54, adapted to engage the pawl 28 when the shaft 16 is being rotated in a rearward driving direction, as indicated by the arrow A in Figs. 2 and 3. For the purpose of automatically bringing the pawl 28 into a non-engaging position, relative to the ratchet teeth 54, upon the initiation of a forward driving rotation of the shaft 16, indicated by the full line arrow B in Figs. 2 and 3, I provide a centrifugally driven governor member or disk 56 which comprises a disk plate 57, formed upon a collar 58, which is slidably mounted on the hub 51 of the ratchet member. The periphery of the disk 56 is adapted to rotate in the U member 39, which is mounted on the pawl actuating rod 37. The hub 51 is externally provided with a segmental helical cam groove 59, so disposed relative to the axis of rotation as to have an advancing action upon a "forward moving" rotation of the shaft 16, and which is adapted to receive a pin 60 that is rigidly mounted in the collar 58 and is slidable in the groove 59. The action of the mentioned pin and groove 59 and 60 for the purpose of moving the disk 56 forwardly and rearwardly upon oppositely rotating the shaft 16 is best illustrated in the diagrammatic views shown in Fig. 8. When the shaft 16 is rotating in a forward driving direction indicated by the arrow B (Fig. 8), the pin 60 is in the position in the groove 59 indicated in full line in Fig. 8, the governor disk 57 will be in the dot and dash line position indicated in Fig. 8 or full line position shown in Fig. 2, and the pawl 28 will thus be held in a non-engaging position as illustrated in full lines in Fig. 3, by means of the cam member 38 mounted on the rod 37. When the rotation of the shaft 16 is reversed in the direction of arrow A, such as by the rearward drifting of the vehicle down a grade, the pin 60 will be carried down the angular groove 59 to the dotted line position shown in Fig. 8, the governor disk 57, the U member 39, the rod 37 and the cam member 38 will be carried rearwardly to the dotted line position shown in Fig. 2, permitting the pawl 28 to drop into engagement with the ratchet teeth 54, as shown in dotted lines in Fig. 3, thus preventing any further rotation of the shaft in a "reverse" direction until the pawl is disengaged by means which will be hereinafter explained.

For the purpose of assuring the initiation of a positive rearward movement of the governor disk 57 upon a "reverse" rotation of the shaft 16, I provide a spiral spring 62, mounted between the inner surface 63 of the forward face 32 of the housing, and a shoulder 64 formed on the collar 58. The function of this spring is merely to overcome any sticking or undue friction between the pin 60 and the groove 59, and assure an immediate release of the pawl 28 from the cam 38 when the vehicle starts drifting in a rearward direction.

In order that the vehicle upon which my invention is mounted may be operated or driven in a reverse gear I provide what I may term a pawl disengaging means 70 which is operable by the gear shifting lever 15 and actuates the pawl operating rod 37 through connecting means such as as the cable 43, and in order that the vehicle may optionally be permitted to drift in a rearward direction, I provide an auxiliary pawl disengaging device 71 which is manually operated independently of the gear shifting lever 15, and which also operates the rod 37 through the cable 43.

The pawl disengaging devices 70 and 71 are illustrated as operating through a yoke mechanism 72 which comprises a yoke rod 73 supported by two supporting rods 74 and 75. The rods 74 and 75 are slidably supported on either side of the transmission 14 in means such as sleeve projections 76, 77, 78 and 79, externally formed on the transmission. In order that the yoke 72 will positively return to a normal position after a pawl disengaging operation has been completed, I provide the rods 74 and 75 with springs 80 and 81 which are mounted between stop members 82 and 83 on the rear ends of the respective rods, and the sleeve projections 77 and 79. The shift lever operated device 70 consists of an arm 84 which is fixed to the yoke rod 73 in a collar 85 and the extending end of which is provided with a shift lever engaging member 86. The arm 84 is so positioned relative to the shift lever 15 that the placement of the latter in a reverse gear position, such as shown in dotted lines in Fig. 7, results in an engagement with the member 86 and a positive forward movement of the yoke 72. The independent manually operated device 71 is illustrated as comprising a foot pedal 87 pivoted at 88, and having an upwardly extending crank hook 89, which engages an extending end 90 on the yoke rod 73, a forward pressure upon the foot pedal 87 being effective to carry the yoke 72 forward independent of the gear shift lever.

It will be understood that, while I have illustrated and described one specific form of a "reverse gear" pawl actuating device and a manually actuated device, various modifications of this portion of my invention may be readily devised by those familiar with the art, whereby various adaptations may be made to different types of transmissions; for instance, this part of my invention might be easily incorporated within the transmission in the factory construction of the vehicle.

It will be further understood that, while I have described my invention as comprising a single pawl and ratchet, in cases of great weight, such as heavily loaded trucks, etc., it may be found advantageous to use a plurality of pawls or a plurality of pawls and ratchets.

The operation of my invention should be obvious from the above description, and it is again emphasized that the fundamental feature of novelty in my invention lies in the fact that the driving wheels are automatically and positively locked against reverse rotation as soon as a rearward drifting movement of the vehicle is initiated.

Although I have herein described but a single embodiment of my invention, it should be understood not only that various features thereof might be independently used, but also that various modifications thereof might be readily developed by those familiar with the art without the least departure from the spirit and scope of my invention, as described above and in the following claims.

I claim as my invention:

1. In a motor driven vehicle: power means; driving means for positively driving said vehicle in two directions; a clutch interposed between said power means and said driving means; and automatic means preventing the movement of said driving means in one direction when said clutch is in disengagement, comprising a ratchet rigidly connected with said driving means, pawl means pivotally fixed relative to said ratchet and engageable therewith, means normally holding said pawl in non-engaging relation with said ratchet, and means for automatically bringing said pawl into engagement with said ratchet upon the initiation of a rearward drifting movement of said vehicle.

2. In a motor driven vehicle: power means; driving means for positively driving said vehicle in two directions; a clutch interposed between said power means and said driving means; and automatic means preventing the movement of said driving means in one direction when said clutch is in disengagement comprising a ratchet rigidly connected with said driving means, pawl means pivotally fixed relative to said ratchet and engageable therewith, means normally holding said pawl in non-engaging relation with said ratchet, means for automatically bringing said pawl into engagement with said ratchet upon the initiation of a rearward drifting movement of said vehicle, and means for automatically disengageing said pawl when said vehicle is placed in reverse gear.

3. In a motor driven vehicle: power means; driving means for positively driving said vehicle in two directions; a clutch interposed between said power means and said driving means; and automatic means preventing the movement of said driving means in one direction when said clutch is in disengagement, comprising a ratchet rigidly connected with said driving means, pawl means pivotally fixed relative to said ratchet and engageable therewith, means normally holding said pawl in non-engaging relation with said ratchet, means for automatically bringing said pawl into engagement with said ratchet upon the initiation of a rearward drifting movement of said vehicle, and manually operated means for optionally disengaging said pawl from said ratchet.

4. In a motor driven vehicle: power means; driving means for positively driving said vehicle in two directions; a clutch interposed between said power means and said driving means; and automatic means preventing the movement of said driving means in one direction when said clutch is in disengagement, comprising a ratchet rigidly connected with said driving means, pawl means pivotally fixed relative to said ratchet and engageable therewith, means normally holding said pawl in non-engaging relation with said ratchet, means for automatically bringing said pawl into engagement with said ratchet upon the initiation of a rearward drifting movement of said vehicle, and means for automatically disengaging said pawl from said ratchet when said vehicle is placed in a reverse gear.

5. In combination with a drive shaft of a motor vehicle, a braking device comprising: a ratchet member having a hub rigidly mounted on said drive shaft; a governor member slidably mounted on said hub; means cooperatively mounted between said governor and said hub for imparting opposite lateral movement to said governor upon the initiation of opposite rotary movement of said shaft; and means operable by said governor for preventing the rotation of said ratchet member in one direction.

6. In combination with a drive shaft of a motor vehicle, a braking device comprising: a ratchet member having a hub rigidly mounted on said drive shaft; a governor member slidably mounted on said hub; means for imparting limited lateral movements to said governor member in opposite directions; a pawl supporting member; a pawl member pivotally mounted thereon in fixed relation to said ratchet; and means operable by said governor member for effecting engagement and disengagement between said pawl and said ratchet.

7. In combination with a drive shaft of a motor vehicle, a braking device comprising: a ratchet member having a hub rigidly mounted on said drive shaft; a governor member slidably mounted on said hub; means for imparting limited lateral movements to said governor member in opposite directions; a pawl supporting member; a pawl member pivotally mounted thereon in fixed relation to said ratchet; and means operable by said governor member for effecting engagement and disengagement between said pawl and said ratchet, comprising a slidable rod having a governor engaging member and a pawl engaging member thereon.

8. In combination with a drive shaft of a motor vehicle, a braking device comprising: a ratchet member having a hub rigidly mounted on said drive shaft; a governor member slidably mounted on said hub; means for imparting limited lateral movements to said governor member in opposite directions; a pawl supporting member; a pawl member pivotally mounted thereon in fixed relation to said ratchet; and means operable by said governor member for effecting engagement and disengagement between said pawl and said ratchet, comprising a slidable rod having a governor engaging member and a pawl engaging member thereon, and separate means for independently imparting movement to said slidable rod.

In testimony whereof, I have hereunto set my hand at Los Angeles, California, this 26th day of October, 1927.

SAMUEL J. MORAN.